Dec. 10, 1963    W. A. PENNOW ETAL    3,113,726
RUNWAY LIGHTING UNIT

Filed Aug. 30, 1960    5 Sheets-Sheet 1

WITNESSES

INVENTORS
Willis A. Pennow &
Charles H. Loch
BY
ATTORNEY

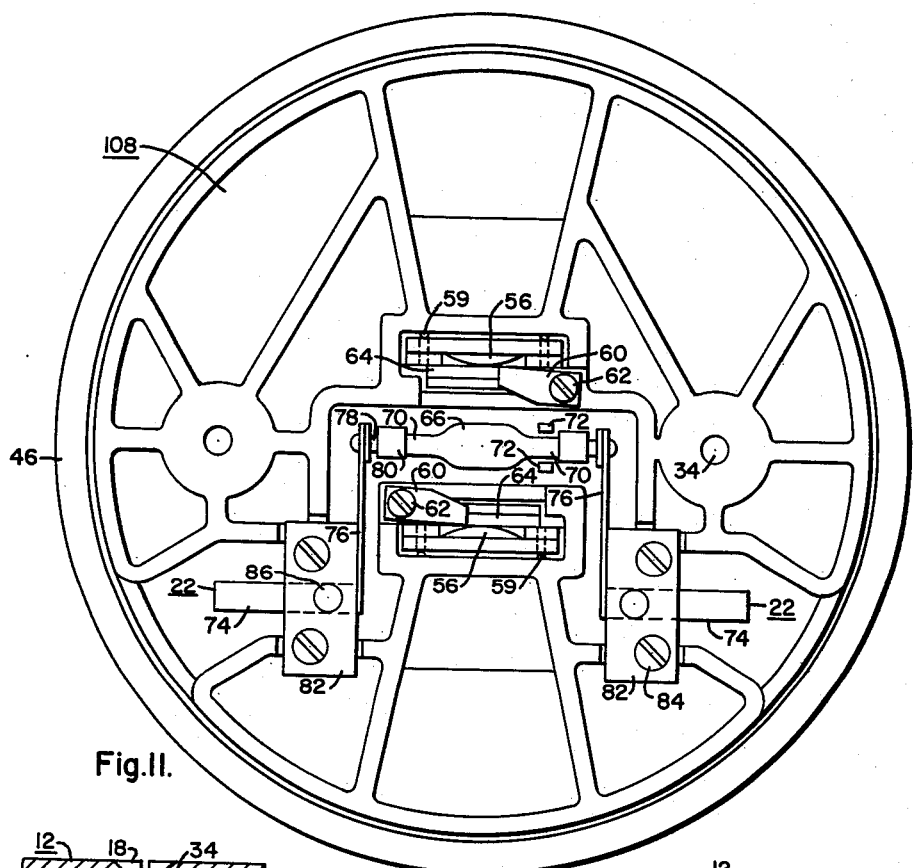
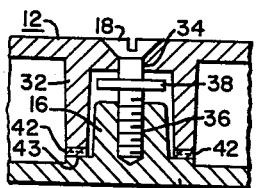
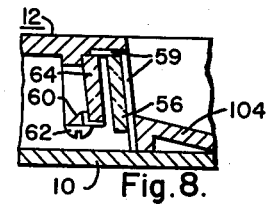
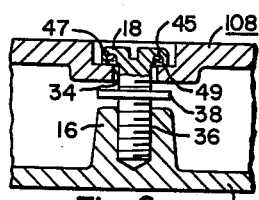
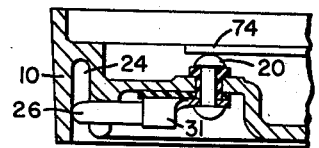

Dec. 10, 1963  W. A. PENNOW ETAL  3,113,726
RUNWAY LIGHTING UNIT
Filed Aug. 30, 1960  5 Sheets-Sheet 4

Dec. 10, 1963 W. A. PENNOW ETAL 3,113,726
RUNWAY LIGHTING UNIT
Filed Aug. 30, 1960 5 Sheets-Sheet 5
Fig. 12.
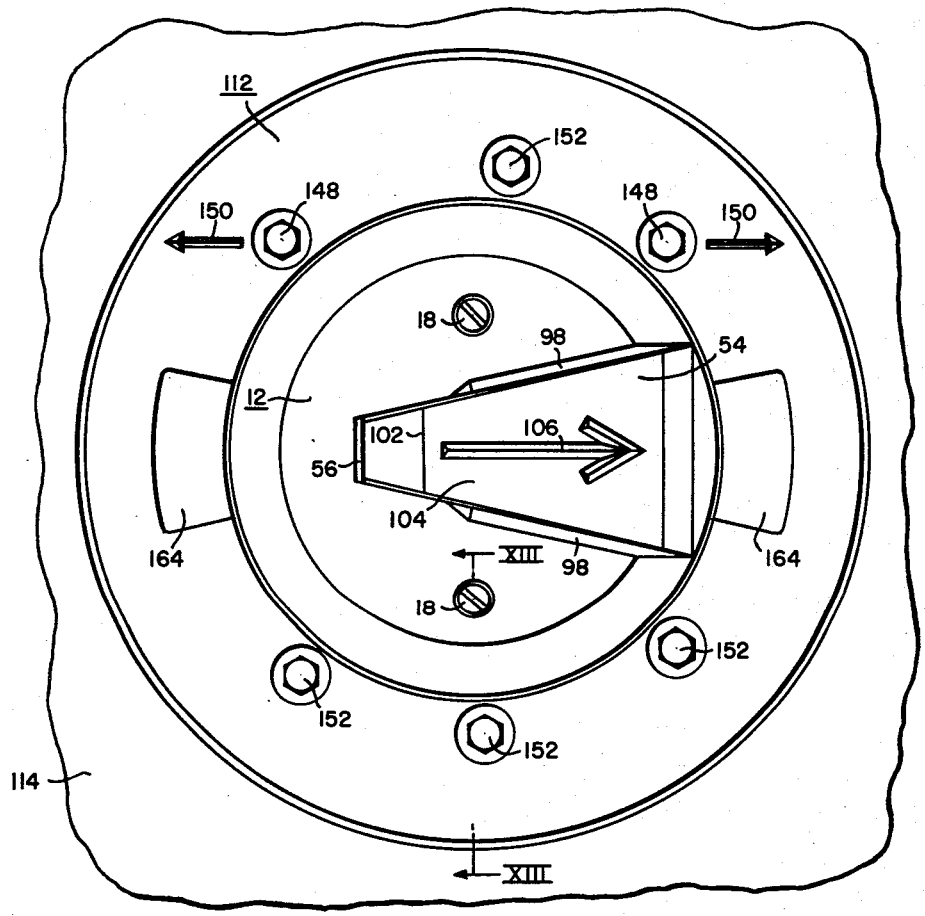
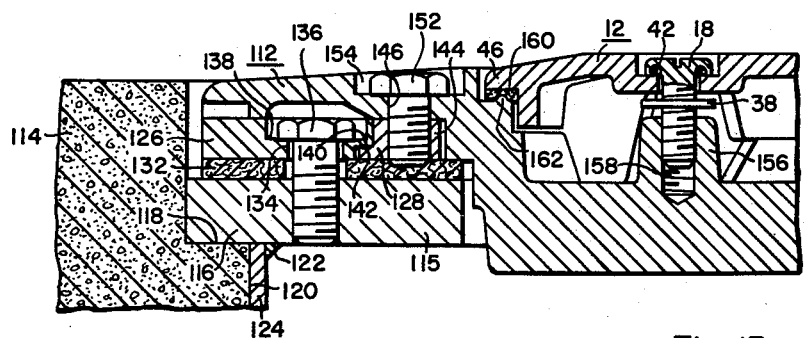
Fig. 13.

United States Patent Office 3,113,726
Patented Dec. 10, 1963

3,113,726
RUNWAY LIGHTING UNIT
Willis A. Pennow, deceased, late of Cleveland, by Collette C. Pennow, executrix, Cleveland, and Charles H. Loch, Shaker Heights, Ohio, assignors to Westinghouse Electric Corporation, East Pittsburgh, Pa., a corporation of Pennsylvania
Filed Aug. 30, 1960, Ser. No. 53,006
15 Claims. (Cl. 240—1.2)

This invention relates to runway and approach lighting units and more particularly to flush-type lighting units wherein the lamp itself is mounted below the level of the runway and the light therefrom is directed toward the pilot by a lens permanently sealed in the top casing assembly of each lighting unit.

With the advent of high-speed jet aircraft many new problems have been created for both military and civilian airports. Among these is the need for better lighting to ensure instant and continuous identification of the runway position and configuration for the pilot. To increase the safety margin for planes that land at high speeds many airports have extended the paved area many feet beyond the runway threshold, or well into the area normally occupied by approach lights. This means that some of the approach lights have been forced to go underground so as to eliminate obstructions in this overrun area of the runway.

Several flush approach lighting units have evolved. One such lighting unit which has achieved commercial success and acceptance is that shown by the present inventors in their copending application Serial No. 33,312, filed June 1, 1960, entitled "Runway Lighting Unit," and assigned to the same assignee as is this invention.

Further, flush mounting of runway lighting units as shown in the present invention and that of the copending application makes possible the placement thereof in the runway surface rather than on each side of the runway. Such flush-mounted lighting units are called "Inset Flush Lights." These inset flush lights can be mounted directly on the center line of the runway in the path of the approaching aircraft rather than on the side edges of the runway surface. Because the peripheral vision of pilots is so limited when landing high-speed aircraft, the problem of having to follow lights along the edges of the runway has been substantially eliminated by these flush-mounted lighting units. The present invention, although somewhat similar to the invention shown in the aforementioned copending application, differs substantially therefrom and is considered to be a much more compact and more easily assembled and maintainable structure.

Accordingly, one of the objects of this invention is to provide a flush-mounted lighting unit requiring a smaller and much shallower hole in the runway surface than that previously possible which results in a lower installation cost.

A further object of the invention is to provide for a flush-mounted lighting unit having an overall height smaller than any other prior unit so that a device which is exactly or substantially flush with the runway surface can be obtained.

Another object of the invention is to provide a runway lighting unit with a wireway which has been incorporated around the perimeter of the unit instead of under it and still serves the function of letting the wire leads be threaded out of the unit in any one of several directions, thus permitting a reduction in overall height of the unit.

Still another object of the invention is to provide a flush-mounted runway light which has a watertight lamp compartment, but in lieu of a single gasket over the bottom has employed three small gaskets, one around the perimeter of the light near the top surface and one around each of the mounting screws, so as to improve the seal by reducing the gasket area and increasing the load per unit area on the gasketing elements.

Yet another object of the invention is the provision of means to limit the pressure on the perimetral gasket so as to prevent loads applied to the top casting of the lighting unit from squeezing the gasket out of the lighting unit.

A further object of the invention is to provide the use of a lens in conjunction with a lamp which enables a flush-mounted lighting unit to provide a beam of light having a large candle power at useful low angles of elevation.

A still further object of the invention is the provision of a flush-mounted lighting unit wherein the lamp thereof, although in a sealed compartment, can be readily replaced by field maintenance personnel.

A still further object of the invention is the provision of lugs on the top casting of the lighting unit of the invention so that the lamp can be positioned with respect to the lens in only one direction so as to always give maximum efficiency when in an operating condition.

Another object of the invention is to provide a flush-mounted lighting unit having a light channel which is so sloped that light beams can be projected therefrom at low angles and yet water and other undesirable materials will be directed away from the lens so as not to interfere with the projecting light beams.

Yet still another object of the invention is to provide an inset lighting unit wherein a color filter can be securely held in position and released by a single clip means.

Another object of the invention is the provision of a flush-mounted lighting unit requiring only a minimum number of bolts for securing the top assembly thereto for ease of maintenance and for quick replacement of parts.

Another object of the invention is to provide for a receptacle which is readily adapted to receive either a unidirectional or a bidirectional top casting assembly.

Still another object of this invention is to provide a top casting assembly mounted by asymmetrically spaced bolts so that the bolts cannot be engaged in the receptacle unless the light assembly is correctly positioned.

A further object of this invention is the provision of a flush-mounted lighting unit adapted to employ, when desired, a reflector in combination with a lamp and a lens so as to make use of light from the lamp that would otherwise be wasted.

Another object of the invention is the provision of an adapter plate which will permit mounting of the inset lighting units of this invention on standard bases such as those employed in the aforementioned copending application where these bases are already fixed in a runway surface.

A still further object of the invention is to provide a flush-mounted light which produces a light beam projected toward the eyes of the pilot of an aircraft on coming in for a landing or taking off from the runway but which projects only slightly above or is flush with the runway surface so as to offer no appreciable obstruction to the wheel of the aircraft passing over it.

Another important object of this invention is to provide a flush-mounted lighting unit which can function efficiently in any weather condition, from clear to rain, snow or fog.

These and other objects of the invention will become more apparent upon consideration of the following detailed description of runway lighting units incorporating various components constructed in accordance with the principles of the invention when taken in connection with the following drawings, in which:

FIG. 5 is a partial cross-sectional view of the mounting assembly of this invention taken along the reference line V—V of FIG. 1;

FIG. 6 is a partial cross-sectional view of a modified form of the mounting assembly of this invention taken along the reference line VI—VI of FIG. 9;

FIG. 7 is a partial cross-sectional view of a terminal contact arrangement according to this invention taken along the reference line VII—VII of FIG. 4;

FIG. 8 is a partial cross-sectional view of the lens and its aligning ridges according to this invention taken along the reference line VIII—VIII of FIG. 1;

FIG. 11 is a bottom plan view of the lighting unit of FIG. 9 with the bottom receptacle removed;

FIG. 12 is a top plan view of the flush-mounted lighting unit of FIG. 1 employed in combination with an adapter assembly for mounting the lighting unit of this invention on a standard base, the entire assembly located in a broken-away section of a runway; and FIG. 13 is a partial cross-sectional view of the adapter and lighting unit of FIG. 12 taken along the reference line XIII—XIII thereof.

Figure 1:
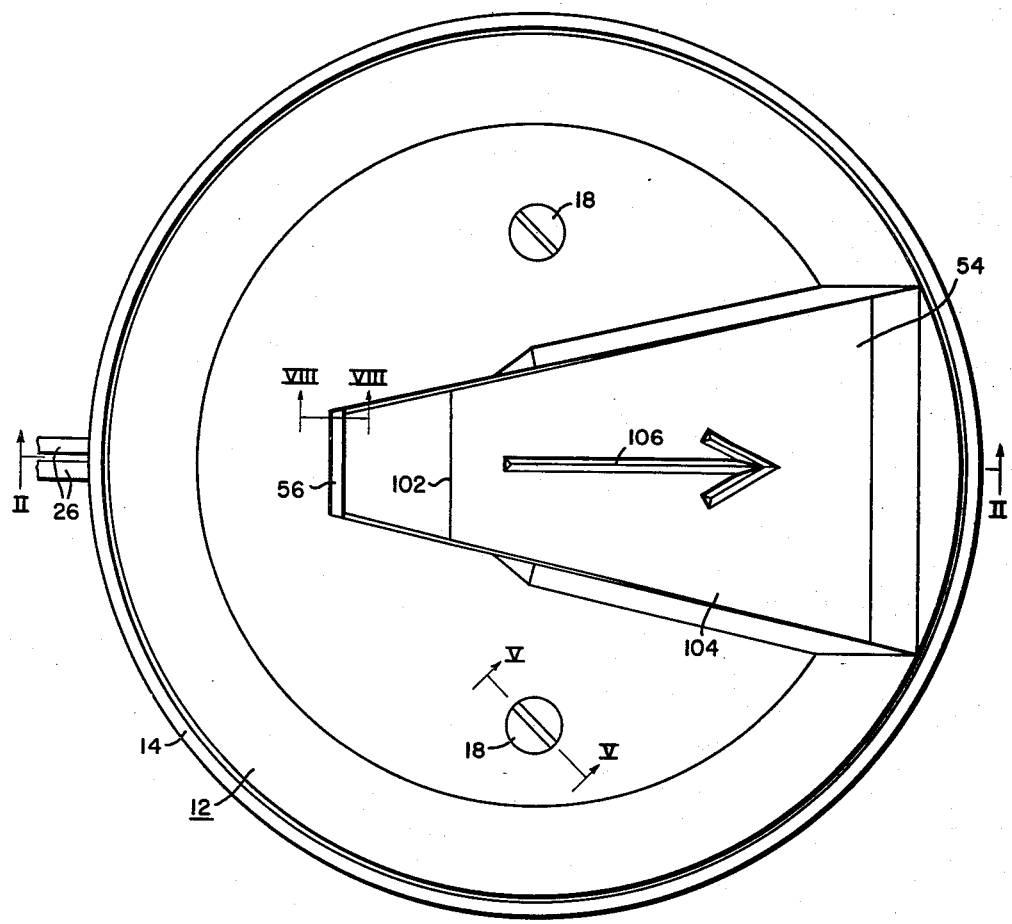
FIGURE 1 is a top plan view of an inset flush lighting unit of the invention with wire leads extending outwardly therefrom.

Referring more particularly to FIGS. 1 to 4, it can be seen that the lighting unit of this invention is generally circular in shape. It is designed to be mounted in a shallow hole in concrete runways, taxiways, aprons, and the like, so as to be substantially flush with the top surface of the concrete. The inset flush-mounted lighting unit of this invention consists primarily of two basic parts, namely, a bottom receptacle 10 and a top casting 12 containing a lighting assembly.

The bottom receptacle 10 is essentially a cup-shaped casting which is permanently installed in a hole in the concrete surface of a runway with an epoxy, or other similar type of adhesive sealer. Its top edge 14 is adapted to be mounted flush with the concrete surface which prevents the concrete from chipping or otherwise breaking off around the edge of the lighting unit. When the receptacle 10 is mounted in the concrete, it presents a smooth, easily cleaned unit for the top casting 12 with the only projections being two bosses 16 to receive the mounting screws 18, as seen in FIGS. 5 and 6 which will be described in more detail later, and two buttons 20 which come through the receptacle bottom as best seen in FIG. 7. The wireway 24 has been incorporated around the perimeter of the lighting unit receptacle 10 instead of under it as was more common in the prior art so as to permit a reduction in the overall height of the unit and provide for a shallower mounting hole resulting in a lower installation cost. This still permits the function of allowing the wire leads 26 to be threaded out of the light in any one of four directions spaced approximately 90° apart as illustrated by three outlets 28 extending from the wireway 24. However, the number and spacing of the outlets 28 can be arranged as desired. The leads 26 terminate at terminal contact buttons 20 that go through the casting bottom and are insulated from the casting by an insulator bushing 31 made of nylon or some other similar material. A small pocket is formed around each terminal contact button 20 which, when in its final assembled position, can be filled with a waterproof insulating compound 30, such as an RTV silastic rubber or an epoxy compound, to completely cover the terminal area and seal the contact buttons 20 to the ends of the wire leads 26 against water and dirt.

Referring again to FIGS. 3 and 5, it can be seen that top casting 12, in one preferred form, has extending downwardly therefrom circular lugs 32 of a diameter sufficient to fit over the bosses 16 of the receptacle 10. The casting 12 and the receptacle 10 are secured together by means of screws 18 fitting through aperture 34 in the top casting and engaging threaded socket 36 in the boss 16. The screws 18 are undercut so as to mount flush with the top surface of the top casting 12 and, of course, the aperture 34 is recessed so as to receive the undercut section of the screws. A metal, fiber, or nylon retaining washer 38 serves to keep the screw 18 captive in the top casting 12. The screws 18 have been unsymmetrically located with respect to the outside diameter of the top casting 12 so that the screws cannot be engaged in the receptacle 10 unless the top casting 12 is correctly positioned. The difference in spacing of these mounting screws 18 or the apertures 34 therefor can be most readily seen by comparing the distances of each from the outside perimeter of the top casting as seen in the bottom views of that assembly in FIGS. 3 and 11.

The top casting 12 and the receptacle 10 can best be sealed to one another by means of three gaskets. The first gasket 40 is located around the perimeter of the lighting unit on outer lip 46 of the top casting 12. The shoulder 44 of the receptacle 10 engages and compresses the gasket when the mounting screws 18 are tightened into place.

Figure 3:
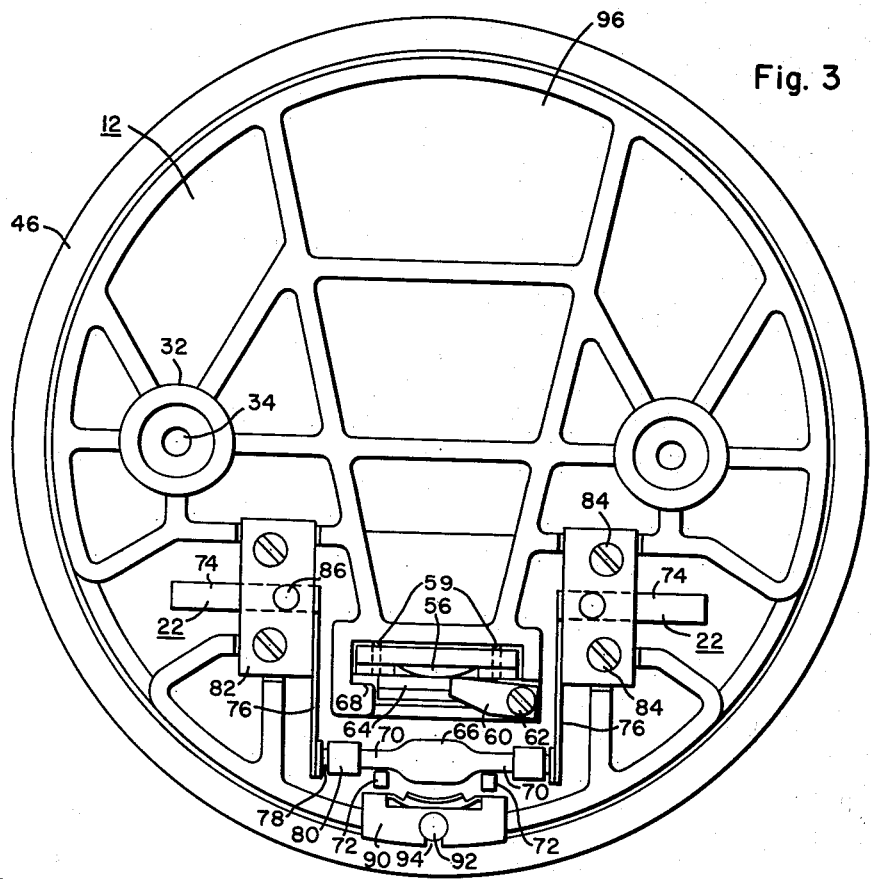
FIG. 3 is a bottom plan view of the lighting unit of FIG. 1 with the bottom receptacle removed.
Figure 9:
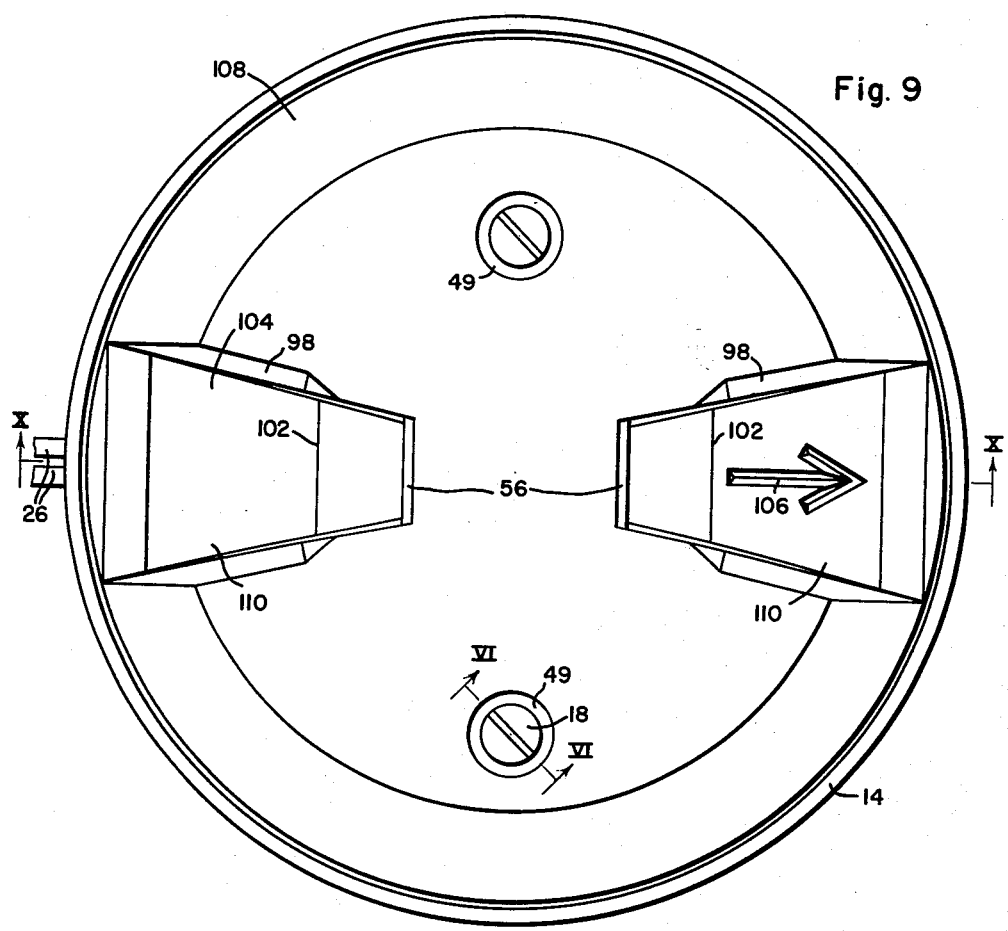
FIG. 9 is a top plan view of another form of a flush-mounted lighting unit constructed in accordance with this invention.

The other two gaskets can be employed either as shown in FIGS. 5 or 6. In FIG. 5 the gasket 42 is located around the mounting screw 18 between the shoulder 43 at the base of the boss 16 and the bottom of the circular lug 32. The gasket 42 thus serves to prevent water that seeps in through the aperture 34 from entering the inner portions of the lighting unit. A top casting assembly employing this arrangement is shown in FIGS. 1 and 3. In FIG. 6 the gasket 45 is of the O-ring type and fits within an annular groove 47 in the head of the screw 18. By engaging the top surface of the recess 49 the gasket 45 seals the screw 18 thereto thus preventing water from entering through the top casting of the lighting unit. This modification possesses one advantage over the modification of FIG. 5 for in the form of FIG. 5 water can fill up the area between the boss 16 and lug 32 and this water can escape into the inner part of the lighting unit when the top casting is separated from the receptacle for maintenance purposes. On the other hand, in the form of FIG. 6, no water can ever get into the inside of the unit and the top casting can be separated from the receptacle without water entering the interior lighting unit. A top casting assembly employing the arrangement of FIG. 6 is shown in FIGS. 9 and 11.

It is also possible to substitute in place of these small gaskets a single, soft, high temperature gasket (not shown) cemented over the entire bottom face of the top casting 12 except in places where access is necessary to the lamp, color filter, mounting screws, etc. This gasket would also serve to seal out water, dirt, and the like, from the lighting unit, but it has been found from the use of the three small gaskets 40 and 42 or 45 that the seal has been improved by reducing the gasket area and increasing the load per unit area on the gaskets.

The top casting 12 has ribs 50 extending downwardly therefrom for seating on the top surface 52 of the bottom of the receptacle 10. The ribs 50 are used to carry loads applied to the top casting. The outermost rib 50 around the perimeter of the top casting also helps prevent any side movement of the top casting 12 with respect to the receptacle 10.

The ribs 50 by resting on the receptacle bottom also serve to limit the squeeze on the main gasket 40 to a predetermined compression. Therefore, the exact length of the rib 50 is critical so as to provide sufficient space between the lip 46 and the shoulder 44 so that when aircraft and the like apply a load to the top casting 12 the gasket 40 is not squeezed out of the unit. If desired, an embossment 39 can be employed to provide the proper predetermined pressure and by pressing up into a limited area of the gasket 40, provide for a means to lock the gasket in position to further prevent its squeezing out of the unit.

The top casting 12 has a somewhat triangularly-shaped trough or cavity 54 therein to provide a light channel and window in front of a lens 56. The lens 56 is positioned by gently pushing it down and forward so that it rests on L-shaped ridges 59 formed on the top casting adjacent the lens openings in the cavity 54. These ridges 59, as best seen in FIG. 8, serve to accurately guide the lens 56 to its correct position within the top castings. The lens 56 is shown slightly tilted with respect to the vertical to give the proper beam angle. However, this tilt will depend on the particular lens used and can vary. The lens 56 is then permanently sealed in the top casting 12 with an RTV silastic rubber or an epoxy cement 58 to provide a permanent, weathertight seal. When desired, clips 60 may be attached to the top casting 12 by means of screws 62 to mount a color filter 64 when it is desired that the light emitted from the lamp 66 be of a particular color. It is to be understood, however, that other means such as brackets or the like can be employed to accommodate the lens 56 in its proper position in the top casting. The color filter 64 is secured in place by means of the clip 60 pressing it against the notches 68 of the top casting 12.

The top casting 12 utilizes a lamp 66 with concave recessed end contacts 80, as shown in FIG. 3. The lamp 66 is preferably a quartz lamp, but it is understood that other lamps may be used. The lamp 66 has rectangularly-shaped flattened end sections 70 which abut against lugs or projections 72 projecting downwardly from the top casting 12 so that the seal, and accordingly the filament (not shown) of the lamp can be mounted in only one position with respect to the lens 56. It is understood that this positioning of the lamp with respect to the top casting can be accomplished in many other ways not here shown, such as by having the flattened end sections of the lamp disposed 90° from their shown position and resting on rectangular embossments or projections on the underside of the top casting. The lamp is so located that a plane passing through the horizontal axis of the lamp 66 and lens 56 will be substantially parallel with the horizontal or the top surface of top casting 12. However, the angle of this plane can be inclined slightly so as to intersect a plane formed by the top surface of the top casting 12 if desired to form a slightly different beam angle.

The lamp most commonly used with this lighting unit has an elongated filament which produces a beam that is rectangularly shaped, and with rounded corners. To be correctly used with the lens of the top casting assembly, the axis of the filament should be mounted so that it is parallel, or nearly so, to the length of the lens. When mounted thusly, the beam pattern emitted from the lens will be rectangularly-shaped with the long dimension in the horizontal plane and the short dimension in the vertical plane. Thus, axial positioning of the lamp 66 with respect to the lens 56 can be obtained by resting the flattened portions 70 of the lamp 66 against the projections 72.

The contacts 22 are L-shaped having two legs 74 and 76 with the wider flat parts of each disposed at approximately 90° with respect to one another. The leg 76 has a protrusion 78 which fits into a recessed end 80 of the lamp 66. The other leg 74 serves to contact the button 20 located in an aperture along the wireway 24 in the receptacle 10 as seen in FIG. 7. The contact 22 mounts on an insulator strip 82, preferably made of a polyester glass or other suitable insulating material, which is in turn mounted to the top casting 12 by means of screws 84. If desired, a screw 86, or the like, can be used to secure each contact 22 to each insulator strip 82. It can thus readily be seen that the pair of contacts 22 serve to position the lamp 66 as well as to provide the electric circuitry of the light assembly.

If desired, a reflector 90 can be mounted around the back portion of the lamp 66 so as to additionally make use of the light that is directed in a direction opposite from that of the lens 56. A substantial proportion of this reflected light passes through the focal point of the lens and will substantially increase the strength of the main beam emanating from the inset flush-mounted lighting unit. A screw 92 engaged with the top casting 12 is inserted into the slot 94 of the reflector 90 so as to securely hold the reflector in position. In this position, the reflector is easily installed and readily detachable. It might also be noted that a combination of a reflector similar to that indicated by the reference numeral 90 and a plain window (not shown) in place of the lens 56 is also possible if a more dispersed light beam is desired.

Although it is possible to employ a film cutout in the area designated by the reference numeral 96 (FIG. 3) of the top casting 12, it has been found that this would not be an advantageous adjunct to the present invention. If this were desired however, wires could be added so as to connect the ends of the contact 22 to the film cutout so that the film circuit is electrically parallel to the lamp 66.

Again returning to the general outline of the top casting 12, it will be noted that as designed it will extend slightly above the runway surface. It is possible to reduce the height of the top casting 12 so that it is exactly flush with the runway surface, but a slight projection like that shown in FIG. 2, for example, does not in any way impair the operability and usefulness of the lighting unit and serves to raise the height of the lighting components 66 and 56 so that a light beam more closely approaching zero degrees with respect to the horizontal runway surface can be obtained.

It is also noted that the top surface around the trough 54 has been cut away slightly at 98 so as to minimize the possibility of snow plough dolly wheels and aircraft tail hooks snagging on the lighting unit or damaging the lens thereof. The sloped edge 98 in conjunction with the outer sloped portion 100 of the top casting assembly substantially minimizes the chance of such an occurrence happening. The bottom 104 of the trough-shaped channel 54 has been dipped to a maximum point at 102 so as to cause water and other undesirable materials to drain away from the lens 56 down into the recessed dip. It is of course understood that the recessed dip at 102 is optional and that the lighting unit would be completely operable if a flat undipped trough bottom were used. The arrow 106 can be inscribed on the bottom surface 104 of the trough 54 so as to indicate a line parallel with the runway center line. Such a line will serve to aid initial positioning of the lighting unit with respect to the runway center line and will serve, in cooperation with the unsymmetrically spaced mounting screws 18, to make sure that the lighting unit is mounted in the correct position when previously removed for maintenance purposes.

The lighting units of the present invention are set directly in the runway paving in such a manner that the light beam is projected toward the eyes of the pilot of an aircraft, either when coming in for a landing or taking off from the runway. The lighting units best perform their function when in the direct forward view of the pilot, located so they may be run over by the aircraft.

In the embodiment of the invention, as described so far, only one lens has been used. This lens is designed so that the lighting unit can be mounted directly on the center of the line of a runway, as mentioned above. Of course, with only one lens, the lighting unit can be used either for an airplane on landing or for an airplane taking off from the runway in a single given direction but cannot, of course, be used for planes landing or taking off in the opposite direction when the wind changes.

Figure 4:
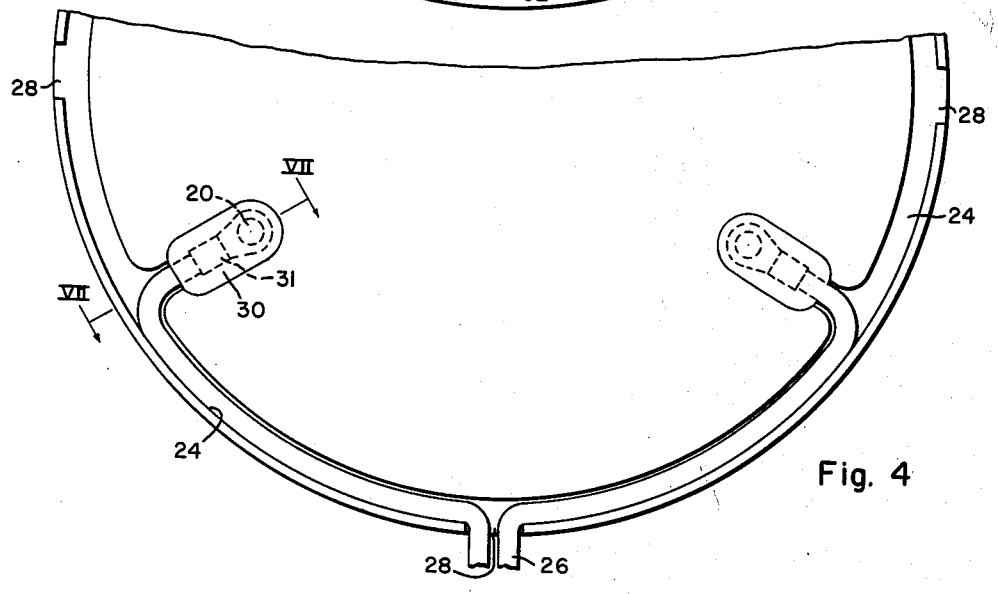
FIG. 4 is a partial bottom plan view of the lighting units of FIGS. 1 and 9 in a completely assembled condition.
Figure 10:
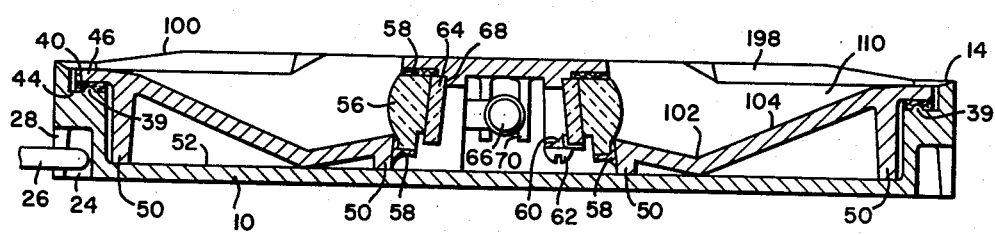
FIG. 10 is a cross-sectional view of the lighting unit of FIG. 9 taken along the reference line X—X thereof.

A lighting unit that can handle air traffic in either direction on a runway, however, is shown in the modification of the invention as found in FIGS. 9 to 11. This lighting unit comprises a top casting 108 containing a lighting assembly and having troughs or cavities 110 forming windows spaced 180° apart so that light beams can extend in opposite directions from a pair of lenses 56 simultaneously. To obtain the embodiment of FIGS. 9 to 11, the lens, trough, and related portions of the top casting 12 of FIGS. 1 to 4 are merely duplicated on opposite sides of the top casting 108 with the exception that the troughs 110 are foreshortened with respect to the troughs 54. The mounting screw assemblies of either FIG. 5 or FIG. 6 can be used in the unidirectional and bidirectional modifications of FIG. 1 and FIG. 9. But for purposes of illustration the assembly of FIG. 5 has been shown in conjunction with the modification of FIG. 1 and the assembly of FIG. 6 has been shown in conjunction with the modification of FIG. 9. The bottom receptacle 10 as shown in FIG. 4 is common to both the modifications of FIGS. 1 and 9. In all other respects, the details of the modification of FIG. 9 are like those of FIG. 1, and where appropriate, like reference numerals have been used to define like parts thereof. For example, the same lamp 66 is used for both lenses 56 of the top casting 108 and the beams emitted from each of these troughs 110 will be substantially identical with that emitted from the trough 54. The only relatively small disadvantage of the bidirectional lighting unit employing a top casting 108 would be that a reflector 90 cannot be employed therein due to the lack of room. In all other aspects, the arrangement of FIG. 9 has all the advantages and efficiencies of the unidirectional top casting 12. One other added advantage of the bidirectional top casting 108, however, may be that the trough 110 is now narrower at the outer edge and that this may further minimize the possibility of tail hooks getting snagged in the lighting unit. With respect to the bidirectional unit shown in FIG. 9, it is within the scope of this invention to slightly incline the troughs 110 so they are not exactly opposite from one another but are only generally disposed opposite one another. This can be done when it is desired to place the units off of the runway center line such as in the narrow gauge lighting system more thoroughly described in the aforementioned copending application.

In addition to the basic unidirectional and bidirectional modifications of the present invention as shown in FIGS. 1 to 11, an adapter unit which will permit mounting of inset flush-mounted lighting units on standard bases in installations where bases are already in the runway pavement has been developed. The standard bases and corresponding standard flush-mounted lighting assemblies are disclosed in the aforementioned copending application, Serial No. 33,312, and details as to the assembly and operation of such a standard unit can be found by reference thereto. Only that portion of the flush-mounted lighting unit of the aforementioned copending application that is pertinent to the present invention will be described here so as to render clear the operation of the adapter as shown in FIGS. 12 and 13.

Figure 2:
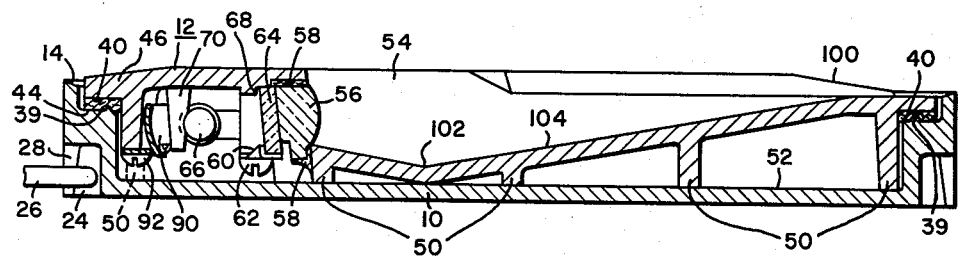
FIG. 2 is a cross-sectional view of the lighting unit of FIG. 1 taken along reference line II—II thereof.

Thus, referring particularly to FIGS. 12 and 13, it can be seen that an inset flush-mounted lighting unit of this invention can be mounted on a standard base by means of employing a top casting 12 containing a lighting assembly in combination with the adapter 112, the adapter 112 being substituted for the receptacle 10 of the inset flush-mounted lighting unit shown in FIGS. 1 and 2, for example. The adapter 112 is designed to be mounted in the concrete runway 114 on a base 115 having a metal base plate 116 cast in the concrete runway with the top face of the base plate 116 being a relatively short distance below the adjacent runway surface. As can be seen in FIG. 13, the circular base plate 116 fits on shoulders 118 notched out of the runway 114. A circular hole or aperture, as defined by the edge 120, is formed in the runway surface to permit the lower elements of the base 115 to be located in the hole beneath the level of the runway surface. Attached to the bottom of the base plate 116, by a weld 122 for example, is a tubular enclosure 124 also forming part of the base 115 and which extends downwardly so as to serve as a housing for the interior components of the standard top casting of the lighting unit as employed in the previously mentioned copending application. As an alternative to this method of mounting the base 115 in the runway, where the runway is to be newly poured concrete it may be more desirable to place the base plate 116 and its attached tubular enclosure 124 partially in a hole in the ground before the concrete is poured and then pour the concrete around the base 115.

The adapter 112 is secured to the standard base 116 by the use of a pair of rings. These rings are, namely, outer clamping ring 126 and inner mounting ring 128, both resting upon the base plate 116. A gasket 132, made of a resilient waterproof material such as rubber, is located between the base plate 116 and the rings 126 and 128 so as to make the connection therebetween a sealed system. The clamping ring 126 has apertures 134 for receiving six equally spaced bolts 136 for securing the clamping ring 126 to the base plate 116. It will be noted that each aperture 134 has a recessed portion 138 so that the head of the bolts 136 may be substantially flush with the top surface of the clamping ring 126.

The clamping ring 126 has an inwardly extending top flange 140 which mates with a cutout shoulder 142 of the mounting ring 128 employed to clamp the inner mounting ring 128 to the base plate 116 when the bolts 136 are fully tightened in their operative position. However, when the bolts 136 are not tightly fastened, the inner mounting ring 128 can be adjusted with respect to the clamping ring 126 by merely rotating it under the flange 140. That is, when the flush-mounted lighting unit is initially installed, the rings 126 and 128 are fitted together and placed on the base plate 116. Then the inner ring 128 is adjusted so that it is in the exact position with respect to the center line of the runway before the bolts 136 are tightened so as to fix the position of the inner mounting ring 128. The inner mounting ring 128 also has six bolt holes or apertures 144, but these are not equally spaced but are so chosen that no two holes 144 in this mounting ring will line up with any other than the correct holes 146 of the adapter 112.

As stated previously, during assembly the outer clamping right 126 is loosely bolted to the base plate 116 so that the mounting ring 128 may be rotated with respect thereto. Two long bolts 148 are mounted in two of the bolt holes 146 which are in line with each of the arrows 150 formed in the top surface of the adapter 112. The bolts 148 serve as handles to rotate the mounting ring and serve as two sight points to exactly line up these holes in a line parallel with the runway center line. Such a parallel line is indicated by the arrows 150. Also, when a line of lighting units is installed, the line of sight across the bolts 148 can be used for sighting the next lighting unit in the line.

After the mounting ring 128 is properly lined up, the bolts 136 are tightened so that the inner ring 128 will no longer rotate. When the adapter 112 is placed on the rings 126 and 128 and the bolt holes lined up, it is then automatically correctly aimed in relation to the center line of the runway. This assures that when the adapter is removed for maintenance it must always be remounted in the correct position, as described.

As also stated previously, the asymmetrical spacing of holes 144 and 146 in the lighting unit means that after the unit has been placed on the rings following maintenance, it must be rotated until the holes 146 in the adapter 112 line up with the corresponding holes 144 in the mounting ring 128. This will automatically be the correct position and eliminate inaccurate aiming often resulting in previous units wherein the hole spacing in the casting rings was symmetrical, and therefore, the light was able to be replaced on the base in any one of the number of different positions.

The remaining bolt holes 144 and 146 that are not engaged by the sighting bolts 148 are engaged by bolts 152 to firmly attach the adapter 112 to the mounting ring 126. The bolts 148 and 152 are able to be recessed into the adapter 112 by means of a cutout portion 154.

Thus, it can be seen that not only the standard base but also the standard mounting and clamping rings of the unit in the aforementioned copending application can be employed so that the only new item that is necessary to place an inset flush-mounted lighting unit with a top casting 12, or 108 therein is the adapter 112. The adapter 112 has upstanding bosses 156 and tapped recesses 158 therein so as to correspond to the portions 16 and 36 of the receptacle. The mounting screws 18 and the bolt retainer 38 are then employed to secure the top casting 12 to the adapter with the gasket 160 resting on the lip 46 of the top casting 12 and being engaged by the shoulder 162 of the adapter 112 so as to provide a seal therebetween.

The substantially rectangular cutout portions 164 and the adapter 112 facilitate the light rays passing through the lens 56 outwardly from the top casting 12. Two such cutout portions 164 are shown so that the adapter 112 can facilitate either the employment of a unidirectional top casting 12 or a bidirectional top casting 108.

Thus, there has been disclosed a flush-mounted inset lighting unit which is easily and accurately installed and maintainable. The lighting unit of this invention is easily adjusted to aline the light beam along any desired path. It also provides for a uniquely simple and operational runway marker light which is extremely shallow in depth and yet which can remain substantially flush with the runway so as to be an unusually efficient and relatively inexpensive unit. This invention also comprehends the employment of an adapter whereby the unidirectional and bidirectional top castings containing the lighting assemblies of the inset flush-mounted lighting units of this invention can be mounted on standard bases already inserted in concrete runways and the like.

Since it is obvious that the invention can be embodied in other forms and constructions within the spirit and scope of the invention, as would be apparent to one skilled in the art, it is to be understood that the particular forms shown are but a few of such embodiments. Accordingly, with various modifications and changes being possible, the invention is not limited in any way with respect thereto beyond the scope of the claims. Moreover, it is to be understood that certain features of the invention can be employed without a corresponding use of other features thereof.

Accordingly, what is claimed as new is:

1. A runway lighting unit comprising, a receptacle having a shoulder portion around the periphery thereof and adapted to be mounted substantially flush in a runway surface, a casting having a top surface and a peripheral flange portion adapted to engage said receptacle shoulder portion, a network of ribs extending downwardly from said top surface and engaging the bottom of said receptacle for positioning said casting in said receptacle and for bearing loads applied to said top surface, means securing said casting substantially within said receptacle, a peripheral gasket located between said casting flange portion and said receptacle shoulder portion, said rib means being of a length so as to limit the pressure on said gasket and still provide a seal between said receptacle and said casting, a downwardly tapered light-channel in said top surface, a lens secured to said casting at the lowermost end of said channel, a lamp secured within said casting and located adjacent said lens, the horizontal axes of said lens and said lamp lying in a plane substantially parallel to said top surface, and means for electrically connecting said lamp to a power source, said casting and receptacle presenting a relatively shallow substantially flush-mounted unidirectional lighting unit with the lamp thereof providing a beam adapted to be substantially flush with the runway surface.

2. A runway lighting unit comprising, a receptacle having a shoulder portion around the periphery thereof and adapted to be mounted substantially flush in a runway surface, a casting having a top surface and a peripheral flange portion adapted to engage said receptacle shoulder portion, a network of ribs extending downwardly from said top surface and engaging the bottom of said receptacle for positioning said casting in said receptacle and for bearing loads applied to said top surface, means securing said casting substantially within said receptacle, a peripheral gasket located between said casting flange portion and said receptacle shoulder portion, said rib means being of a length so as to limit the pressure on said gasket and still provide a seal between said receptacle and said casting, a pair of generally oppositely disposed downwardly tapered light-channels in said top surface, a lens secured to said casting at the lowermost end of each of said channels, a lamp secured within said casting and located adjacent said lens, the horizontal axes of said lens and said lamp lying in a plane substantially parallel to said top surface, and means for electrically connecting said lamp to a power source, said casting and receptacle presenting a relatively shallow substantially flush-mounted bidirectional lighting unit with the lamp thereof providing a beam adapted to be substantially flush with the runway surface.

3. A runway lighting unit comprising, a cylindrical cup-shaped relatively shallow bottom receptacle having a top edge adapted to be mounted substantially flush with a runway surface, said receptacle having an inwardly disposed shoulder portion about the periphery thereof, a top casting for containing a lighting assembly, said casting having a top surface and an outwardly extending peripheral flange portion adapted to engage said receptacle shoulder portion, a network of ribs extending downwardly from the underside of said top surface and engaging the bottom of said receptacle for positioning said casting in said receptacle and for bearing loads applied to said top surface, means securing said casting in said receptacle so that the top surface of said casting is substantially flush with the top edge of said receptacle, a peripheral gasket interposed between said receptacle shoulder portion and said casting flange portion, said ribs being of a length so as to limit the pressure on said gasket and still provide a seal between said receptacle and said casting, a cavity in said top surface providing a light channel therein, a lens located at one end of said cavity, projections extending laterally from sides of said lens, ridge means in said casting engaging said lens projections for positioning said lens within said casting, means securing said lens to said casting, a lamp located within and attached to said casting adjacent said lens but spaced therefrom, means positioning said lamp with respect to said lens to present a beam substantially flush with the runway surface, and means for electrically connecting said lamp with a power source, said receptacle and said casting presenting a relatively shallow lighting unit.

4. A runway lighting unit comprising, a cup-shaped relatively shallow bottom receptacle having a top edge adapted to be mounted substantially flush with a runway surface, said receptacle having an inwardly disposed shoulder portion about the periphery thereof, a top casting for containing a lighting assembly, said casting having a top surface and an outwardly extending peripheral flange portion adapted to engage said receptacle shoulder portion, a network of ribs extending downwardly from the underside of said top surface and engaging the bottom of said receptacle for positioning said casting in said receptacle and for bearing loads applied to said top surface, means securing said casting in said receptacle so that the top surface of said casting is substantially flush with the top edge of said receptacle, a peripheral gasket interposed between said receptacle shoulder portion and said casting flange portion, said ribs being of a length so as to limit the pressure on said gasket and still provide a seal between said receptacle and said casting, a cavity in said top surface providing a light channel therein, a lens located at one end of said cavity, projections extending laterally from sides of said lens, ridge means in said casting engaging said projection for positioning said lens within said casting, means securing said lens to said casting against said ridge means, a lamp located within and attached to said casting adjacent said lens but spaced therefrom, said lamp having flattened ends, projecting means integral with said casting engaging the flattened ends of said lamps so that the lamp can be positioned in only an optically correct relationship with respect to said lens in order to present a beam substantially flush with the top of said casting, and means for electrically connecting said lamp with a power source, said receptacle and said casting presenting a relatively shallow lighting unit.

5. A runway lighting unit comprising, a cup-shaped relatively shallow bottom receptacle having a top edge adapted to be mounted substantially flush with a runway surface, said receptacle having an inwardly disposed shoulder portion about the periphery thereof, a top casting for containing a lighting assembly, said casting having a top surface and an outwardly extending peripheral flange portion adapted to engage said receptacle shoulder portion, a network of ribs extending downwardly from the underside of said top surface and engaging the bottom of said receptacle for positioning said casting in said receptacle and for bearing loads applied to said top surface, means securing said casting in said receptacle so that the top surface of said casting is substantially flush with the top edge of said receptacle, a peripheral gasket interposed between said receptacle shoulder portion and said casting flange portion, said ribs being of a length so as to limit the pressure on said gasket and still provide a seal between said receptacle and said casting, a cavity in said top surface providing a light channel therein, a lens located at one end of said cavity, means in said casting for positioning said lens within said casting, means for securing said lens to said casting, a color filter located adjacent said lens, clip means secured to said top casting and engaging said filter to support the filter in a fixed position, a lamp located within and attached to said casting so as to be adjacent said filter and lens but spaced therefrom, said lamp having flattened ends, projecting means integral with said casting and engaging the flattened ends of said lamps so that the lamp can be positioned in only an optically correct relationship with respect to said lens in order to present a beam substantially flush with the top of said casting, and means for electrically connecting said lamp with a power source, said receptacle and said casting presenting a relatively shallow lighting unit.

6. A runway lighting unit comprising, a cup-shaped receptacle having a peripheral shoulder portion and adapted to be mounted substantially flush in a runway surface, a casting having a top surface and a peripheral flange portion adapted to engage said shoulder portion, a network of ribs extending downwardly from the underside of said top surface and engaging the bottom of said receptacle for positioning said casting in said receptacle and for bearing loads applied to said top surface, means securing said casting substantially within said receptacle, a peripheral gasket located betwen said receptacle shoulder portion and said casting flange portion, said rib means being of a length so as to limit the pressure on said gasket and still provide a seal between said receptacle and said casting, a downwardly tapered light-channel in said top surface, a lens secured to said casting at the lowermost end of said channel, a lamp secured within said casting and located adjacent said lens, the horizontal axes of said lens and said lamp lying in a plane substantially parallel to said top surface, and means for electrically connecting said lamp to a power source, said casting and receptacle presenting a relatively shallow substantially flush-mounted unidirectional sealed lighting unit with the lamp thereof providing a beam adapted to be substantially flush with the runway surface.

7. A runway lighting unit comprising, a cup-shaped relatively shallow bottom receptacle having a peripheral shoulder portion, a top edge adapted to be mounted substantially flush with a runway surface, a top casting having a peripheral flange portion adapted to engage said shoulder portion, means for securing said casting in said receptacle so that the top surface of said casting is substantially flush with the top edge of said receptacle, a cavity in said top surface providing a light channel therein, a lens located at one end of said cavity, a network of load bearing rib means in said casting for supporting said casting against the bottom of said receptacle, a peripheral gasket interposed between said receptacle shoulder portion and said casting flange portion, said ribs being of a length so as to limit the pressure on said gasket and still provide a seal between said receptacle and said casting, a color filter located behind said lens, clip means secured to said top casting and engaging said filter to support the filter in a fixed position, a lamp located within and attached to said top casting so as to be adjacent said filter and lens but spaced therefrom, said lamp having flattened ends, projection means integral with said casting and engaging the flattened ends of said lamp so that the lamp can be positioned in only an optically correct relationship with respect to said lens in order to present a rectangular-shaped beam substantially flush with the top of said runway surface, and a reflector secured to said casting and located adjacent said lamp but on the side thereof generally opposite said lens so as to reflect through the lens a portion of the light emitted from said lamp to reinforce said beam, means for electrically connecting said lamp with a power source, said receptacle and said top casting presenting a relatively shallow lighting unit.

8. A runway lighting unit comprising, a cup-shaped relatively shallow bottom receptacle having a top edge adapted to be mounted substantially flush with a runway surface, a wireway formed in the bottom of the receptacle and located substantially around the perimeter thereof, said wireway having at least one outlet from the receptacle, said bottom of the receptacle having apertures extending therethrough and located within said wireway, contact buttons located in said apertures, a top casting, asymmetrically spaced for securing said casting in said receptacle in only an optically correct position with respect thereto, the top surface of said casting being substantially flush with the top edge of said receptacle, a cavity in said top surface providing a light channel therein, a lens located at one end of said cavity, ridge means in said casting for locating said lens, means for securing said lens in said casting, a color filter located behind said lens, clip means secured to said casting and engaging said filter to support the filter in a fixed position, a lamp located within and attached to said casting adjacent said filter and said lens but spaced therefrom, said lamp having flattened ends, outwardly projecting lugs integral with said top casting and engaging the flattened ends of said lamp so that it can be positioned in only an optically correct relationship with respect to said lens, said lamp presenting a rectangularly-shaped beam substantially flush with the top of said casting, an L-shaped contact located adjacent each end of said lamp and having a projection at one end thereof engaging a recessed end of said lamp, the other end of said contact engaging one of said contact buttons in the receptacle apertures, and wire leads in said wireway each having one end thereof connected to a contact button and extending outwardly through said at least one outlet for engaging a power source.

9. A runway lighting unit comprising, a cup-shaped relatively shallow bottom receptacle having a top edge adapted to be mounted substantially flush with a runway surface, a wireway formed in the bottom of the receptacle and located substantially around the perimeter thereof, said wireway having at least one outlet from the receptacle, said bottom of the receptacle having apertures extending therethrough and located within said wireway, contact buttons located in said apertures, a top casting, asymmetrically spaced means for securing said casting in said receptacle in only one possible position with respect thereto, the top surface of said casting being substantially flush with the top edge of said receptacle, a cavity in said top surface providing a light channel therein, a lens located at one end of said cavity, means in said top casting for supporting said lens, a color filter located behind said lens, clip means secured to said top casting and engaging said filter to support the filter in a fixed position, a lamp located within and attached to said top casting adjacent said filter and said lens but spaced therefrom, said lamp having flattened ends and an elongated filament in the center thereof, outwardly projecting lugs integral with said top casting and engaging the flattened ends of said lamp so that it can be positioned in only an optically correct relationship with respect to said lens, said lamp presenting a rectangularly-shaped beam substantially flush with the top of said top casting, a reflector secured in said top casting directly behind said lamp so as to reflect light impinging thereon through the lens with the result that a higher candle power light beam may be had, an L-shaped contact located adjacent each end of said lamp and having a button at one end thereof engaging a recessed end of said lamp, the other end of said contact engaging one of said contact buttons in the receptacle apertures, and wire leads in said wireway each having one end thereof connected to a contact button and extending outwardly through said at least one outlet for engaging a power source.

10. A runway lighting unit comprising, a cup-shaped relatively shallow bottom receptacle having a top edge adapted to be mounted substantially flush with a runway surface, a wireway formed in the bottom of the receptacle and located substantially around the perimeter thereof, said wireway having at least one outlet from the receptacle, said bottom of the receptacle having apertures extending therethrough and located within said wireway, contact buttons located in said apertures, a top casting, asymmetrically spaced means for securing said casting in said receptacle in only one possible position with respect thereto, the top surface of said casting being substantially flush with the top edge of said receptacle, a cavity in said top surface providing a light channel therein, a recessed dip in the bottom of said cavity located intermediate thereof so as to provide an area for undesirable materials to accumulate away from either end of said cavity, a lens located at one end of said cavity, means in said casting for supporting said lens therein, a color filter located behind said lens, clip means secured to said casting and engaging said filter to support the filter in a fixed position, a lamp located within and attached to said casting adjacent said filter and said lens but spaced therefrom, said lamp having flattened ends, projecting means integral with said top casting and engaging the flattened ends of said lamp so that it can be positioned in only an optically correct relationship with respect to said lens, said lamp presenting a beam substantially flush with the top of said top casting, an L-shaped contact located adjacent each end of said lamp and having a button at one end thereof engaging a recessed end of said lamp, the other end of said contact engaging one of said contact buttons in the receptacle apertures, and wire leads in said wireway each having one end thereof connected to a contact button and extending outwardly through said at least one outlet for engaging a power source.

11. A runway lighting unit comprising, a cup-shaped relatively shallow bottom receptacle having a top edge adapted to be mounted substantially flush with a runway surface, a wireway formed in the bottom of the receptacle and located substantially around the perimeter thereof, a top casting containing a lighting assembly, said casting having substantially the same configuration as said receptacle and also having an outside diameter somewhat less than that of the receptacle so as to be fittable therein, asymmetrically spaced apertures in the top surface of said casting, upwardly extending bosses formed in the bottom of the receptacle presenting apertures in registration with said casting apertures, screw means passing through said registered apertures so as to secure said casting in said receptacle in only an optically correct position with respect thereto, an individual gasket around the perimeter of said casting and receptacle and located between flanged portions thereof, individual gaskets surrounding said screw means and engaged by a top surface of the casting, the top surface of said casting being substantially flush with the top edge of said receptacle, said casting of said receptacle forming a relatively shallow sealed lighting unit.

12. A runway lighting unit comprising, a cup-shaped relatively shallow bottom receptacle having a top edge adapted to be mounted substantially flush with a runway surface, a wireway formed in the bottom of the receptacle and located substantially around the perimeter thereof, a top casting containing a lighting assembly, said casting having substantially the same configuration as said receptacle and also having an outside diameter somewhat less than that of the receptacle so as to be fittable therein, asymmetrically spaced apertures in the top surface of said casting, upwardly extending bosses formed in the bottom of the receptacle presenting apertures in registration with said casting apertures, downwardly projecting lugs integral with the casting and surrounding said bosses, screw means passing through said registered aperture so as to secure said casting in said receptacle in only an optically correct position with respect thereto, an individual gasket around the perimeter of said casting and receptacle and located between flanged portions thereof, individual gaskets surrounding said bosses and engaged by the receptacle bottom and said lugs, the top surface of said casting being substantially flush with the top edge of said receptacle, said casting of said receptacle forming a relatively shallow sealed lighting unit.

13. A runway lighting unit comprising, a cup-shaped relatively shallow bottom receptacle having a peripheral shoulder portion and a top edge adapted to be mounted substantially flush with a runway surface, a top casting containing a lighting assembly, said casting having a top surface and an outwardly extending peripheral flange portion adapted to engage said receptacle shoulder portion, a network of ribs extending downwardly from the underside of said top surface and engaging the bottom of said receptacle for positioning said casting in said receptacle and for bearing loads applied to said top surface, means securing said casting in said receptacle so that the top surface of said casting is substantially flush with the top edge of said receptacle, a peripheral gasket interposed between said receptacle shoulder portion and said casting flange portion, said ribs being of a length so as to limit the pressure on said gasket and still provide a seal between said receptacle and said casting, said lighting assembly comprising a pair of cavities in said top surface providing light channels therein, said cavities being disposed substantially opposite from one another, a lens located at one end of each of said cavities, ridge means integral with said casting partially supporting the front and top edge of each of said lens, a color filter located behind each of said lens, clip means secured to said casting supporting each filter in a fixed position, a lamp located within said top casting intermediate each said filter and each said lens, said lamp having flattened ends, projecting means integral with said casting and engaging the flattened ends of said lamp so that it can be positioned in only an optically correct relationship with respect to each of said lens to present a pair of beams projecting from each of said cavities substantially flush with the top of said casting, and electrical means for connecting said lamp to a power source, said receptacle and said top assembly presenting a relatively shallow-bidirectional lighting unit for flush mounting in a runway surface.

14. A runway lighting unit comprising, a base cast in a runway surface, mounting and clamping rings secured to said base, an adapter member, asymmetrically spaced registered apertures in said adapter member and said mounting ring, means securing said adapter member to the top of said base and said rings so that the top surface of said adapter member can be mounted substantially flush with a runway surface, a recessed portion in the center of said adapter member, upwardly extending bosses in said recessed portion, a top lighting assembly fitted in said recessed portion and having openings in registration with holes in said bosses and means engaging said registered openings and holes securing said assembly to said base so that the top surface of said assembly is substantially flush with the surface of the runway.

15. A runway lighting unit comprising, a cup-shaped relatively shallow bottom receptacle having a top edge adapted to be mounted substantially flush with a runway surface, a top member containing a lighting assembly, said member having substantially the same configuration as said receptacle and also having an outside diameter somewhat less than that of the receptacle so as to be fittable therein, asymmetrically spaced apertures in the top surface of said member, upwardly extending bosses formed in the bottom of the receptacle presenting apertures in registration with said member apertures, holding means passing through said registered apertures securing said member in said receptacle in only an optically correct position with respect thereto, an individual gasket around the perimeter of said member and receptacle and located between flanged portions thereof, individual gaskets surrounding said holding means and engaged by a top surface of the member, the top surface of said member being substantially flush with the top edge of said receptacle, said member and said receptacle forming a relatively shallow sealed lighting unit.

References Cited in the file of this patent

UNITED STATES PATENTS

| | | |
|---|---|---|
| 2,284,878 | McDowell | June 2, 1942 |
| 2,352,801 | Rolph | July 4, 1944 |
| 2,420,545 | Leader | May 13, 1947 |
| 2,715,152 | Balzer | Aug. 9, 1955 |
| 2,848,597 | Knottnerus | Aug. 19, 1958 |
| 3,007,034 | Reed et al. | Oct. 31, 1961 |
| 3,015,717 | Angier | Jan. 2, 1962 |

FOREIGN PATENTS

| | | |
|---|---|---|
| 760,427 | Germany | July 5, 1954 |
| 759,848 | Great Britain | Oct. 24, 1956 |